(No Model.)
J. NATH.
ROLLING PIN.
No. 278,258. Patented May 22, 1883.
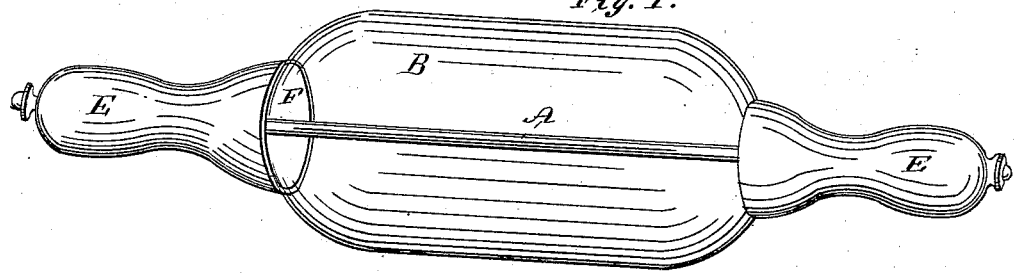
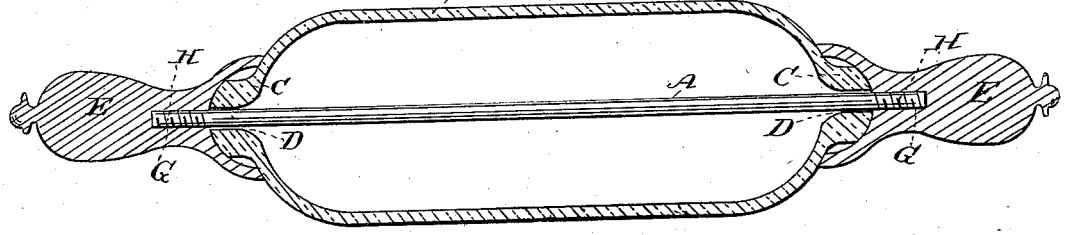
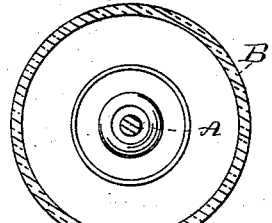
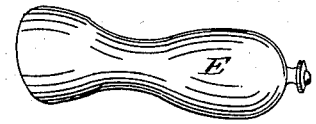
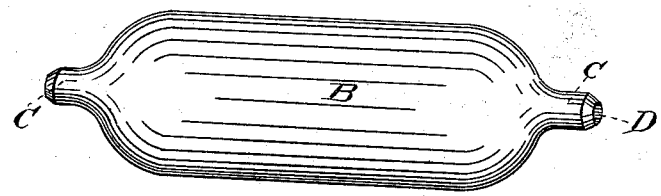
Joseph Nath,
INVENTOR
WITNESSES
Chas. R. Burr
W. E. Bowen
by
A. Snow &Co.
Attorneys.

UNITED STATES PATENT OFFICE.

JOSEPH NATH, OF LANCASTER, NEW YORK.

ROLLING-PIN.

SPECIFICATION forming part of Letters Patent No. 278,258, dated May 22, 1883.

Application filed March 23, 1883. (No model.)

*To all whom it may concern:*

Be it known that I, JOSEPH NATH, a citizen of the United States, residing at Lancaster, in the county of Erie and State of New York, have invented a new and useful Rolling-Pin, of which the following is a specification, reference being had to the accompanying drawings.

This invention relates to rolling-pins, and has for its object to provide a simple, inexpensive, durable, and efficient device that will materially lessen the labor of rolling.

In the drawings, Figure 1 is a perspective view of my improved rolling-pin. Fig. 2 is a longitudinal sectional view of the same. Fig. 3 is a transverse sectional view thereof. Fig. 4 is a perspective view, showing the parts comprising my improved rolling-pin detached.

Referring to the drawings, A designates a longitudinal central rod or shaft, on which the roller B revolves. The latter consists of a cylindrical and tubular roller, preferably formed of glass, and having its ends C C tapered down to form gudgeons or trunnions, through which perforations D are provided for the passage of the longitudinal stationary shaft A.

E E designate the end handles of my improved rolling-pin, each of which is provided with a recess or chamber, F, in its inner end, to receive the end C of the central glass roller, and thereby retain the latter in position on the rod A. In the end walls of the recesses F are provided holes or recesses G, that are screw-threaded and receive the correspondingly screw-threaded ends H H of the rod A, to secure the parts of the rolling-pin in relative position.

By unscrewing the handle from the end of the rod A it can be removed off the latter, and then the central glass roller can be also slid off the rod when it is desired to separate the parts for cleaning, substitution, or any other purpose.

In operation the handles are held in the hands in the usual manner, which retains the rod A stationary, so that the roller revolves on the same. There is consequently no friction of the handles with the hand, and the pin is more easily operated. Besides, the parts can be readily separated when desired.

I claim as my invention—

As an improvement in rolling-pins, the combination of the shaft A, the handles having the hemispherical or curved recess F in their inner ends, and provided with the recesses G, extending from the chamber F and receiving the end of shaft A, and the roller B, tapered at its ends down to gudgeons having the perforations D D, these gudgeons being received into the corresponding recesses F F, and having their bearings on the shaft A inside the recesses or chambers F F, as set forth.

In testimony that I claim the foregoing as my own I have hereto affixed my signature in presence of two witnesses.

JOSEPH NATH.

Witnesses:
 WM. J. BOSTON,
 JOHN PAUL GUNTHER.